Patented Oct. 29, 1946

2,410,254

UNITED STATES PATENT OFFICE 2,410,254

PROCESS FOR THE PRODUCTION OF VITAMIN D

James Waddell, Metuchen, N. J., and Warren W. Woessner, Wilmington, Del., assignors to E. I. du Pont de Nemours & Company, Wilmington, Del., a corporation of Delaware No Drawing. Application November 21, 1942, Serial No. 466,497

6 Claims. (Cl. 204—159)

This invention relates to an improved process for the production of vitamin D and more particularly refers to a cyclic antirachitic activation process wherein the provitamin D or mixture thereof undergoing activation is substantially stable throughout each phase of the process and is readily isolated from the activated products.

It is known that many provitamins D deteriorate rapidly upon exposure to air or other natural influences, or upon being subjected to activation. Some provitamins D are more susceptible to these deteriorating influences than others. For example, 7-dehydrocholesterol will deteriorate much more rapidly upon exposure to air than will ergosterol. Nevertheless, all provitamins D are subject to deterioration when stored or processed under ordinary conditions.

The deterioration of provitamins D is particularly pronounced during commercial activation processes because after each phase of the cyclic process it is necessary to separate the unchanged provitamin D from the vitamin D formed by the preceding activation step. Separation of these materials is extremely difficult and customarily results in the loss of appreciable quantities of provitamin D, either because of deterioration or because of mechanical difficulties. After the provitamin D is separated from the vitamin D further loss takes place due to deterioration before it is subjected to the succeeding phase in the cyclic activation process. These losses have been overcome by the use of certain stabilizing agents in accordance with the invention set forth in a copending application filed by Rosenberg and Woessner on November 21, 1942, Serial Number 466,496, entitled "Stable provitamin D compositions." However, after one or more passes through the cyclic activation process the stable provitamin D compositions described in the foregoing application contain such a large amount of stabilizing agent that their further processing is economically inadvisable. It has been suggested, to overcome this difficulty, that the recovered provitamin D in admixture with excessively large quantities of stabilizing agent be treated in order to remove the excess of stabilizing agent. Such treatment, however, is disadvantageous because it is time-consuming and expensive; likewise, it requires the succeeding activation step to be delayed until it has been completed. A still further disadvantage is that a further loss in provitamin D is occasioned by the removal therefrom of stabilizing agent.

It is an object of this invention to overcome the foregoing disadvantages and many others which directly or indirectly result therefrom. A further object is to devise a new cyclic antirachitic activation process which produces a noticeably larger yield of vitamin D than was heretofore possible. A still further object is to activate provitamin D or mixtures thereof in conjunction with stabilizing agents by means of a process wherein it is unnecessary to remove any of the stabilizing agent from the recovered provitamin D. Additional objects will become apparent from a consideration of the following specification and claims.

These objects are attained in accordance with the present invention wherein the stabilized provitamin D is subjected to antirachitic activation, unchanged provitamin D in admixture with excessive quantities of stabilizing agent is recovered therefrom, and this is mixed with provitamin D of substantially greater purity, to produce a resulting stabilized mixture of increased provitamin D content. In a more restricted sense, this invention is directed to a process wherein provitamin D is antirachitically activated, the resulting vitamin D is separated from the provitamin D with the assistance of inactivatable sterols, and the provitamin D-sterol mixture is intimately mixed with additional provitamin D to form a mixture containing at least 30% provitamin D and a sufficient amount of antirachitically inactivatable sterols to stabilize the provitamin D. In a still more restricted sense this invention is concerned with a cyclic process wherein provitamin D stabilized with inactivatable sterols is subjected to antirachitic activation, the resulting vitamin D is separated from the provitamin D and the latter is intimately admixed with additional provitamin D of substantially greater purity in such quantities that the so-produced mixture contains at least 30 per cent provitamin D. In a still more restricted sense, the foregoing processes are conducted in such manner that in each activation step the initial provitamin D mixture contains at least 30% provitamin D and at least 20% of inactivatable sterols. In a still more restricted sense, these processes are conducted on mixtures containing either 7-dehydrocholesterol or provitamin D from mussels as the activatable substance and either cholesterol or the inactivatable sterols from mussels as the stabilizing agent. In its preferred embodiment this invention is concerned with a cyclic process wherein the provitamin D subjected to each activation phase of the process is present in intimate admixture with a stabilizing agent, the provitamin D constituting about 50% of said mixture and the stabilizing agent comprising cholesterol or other inactivatable sterols and being present in an amount equal to about 50% of said mixture, the foregoing proportion being obtained for each succeeding step of the cyclic process by adding to the recovered mixture of provitamin D and stabilizing agent sufficient substantially pure provitamin D to obtain the desired ratio of constituents.

The invention may be more readily understood by a consideration of the following illustrative examples wherein the quantities are stated in parts by weight.

*Example I*

10 parts of cholesterol and 10 parts of 7-dehydrocholesterol (freshly prepared by known methods) were dissolved in peroxide-free ethyl ether. This solution was irradiated with ultraviolet light by passing it through a quartz apparatus surrounding mercury vapor lamps. After irradiation the solution was concentrated to incipient crystallization by distilling away the ether. To this concentrated solution was then added about 3 times its volume of warm ethyl alcohol (S. D. 2B) and the resulting mixture refrigerated overnight. The following day the precipitated crystals (crop A), representing a mixture of cholesterol and unchanged 7-dehydrocholesterol, were filtered off and washed with cold ethyl alcohol. The mother liquors (plus the wash liquors) were further concentrated by distilling under vacuum to between one-third and one-quarter of their volume. This concentrated solution was then allowed to refrigerate again overnight to precipitate a further crop (crop B) of cholesterol plus 7-dehydrocholesterol crystals. These in turn were filtered off and washed and the mother liquors again concentrated by vacuum distillation. However, it was found that for all practical purposes all of the unchanged 7-dehydrocholesterol had been recovered in the two crops of crystals already removed. To the remaining mother liquors, containing the vitamin D, corn oil was added and the alcohol completely distilled away leaving the vitamin D concentrate as a clear oil solution.

Spectroscopic analysis of crystal crops A and B indicated a total recovery of 49 per cent of unchanged 7-dehydrocholesterol from the above irradiation. All but a small amount of the cholesterol was also recovered. Surprisingly the recovery of unchanged 7-dehydrocholesterol was greater than in previous experiments done under similar conditions but without the presence of the cholesterol. Further, biological assay of the vitamin D produced showed a much better yield than when the above example was carried out in the absence of cholesterol, the increase in yield amounting to almost 40%. It is probable that this improvement in yield is to be explained mainly on the better recovery of provitamin (yield of vitamin is calculated on the amount of provitamin which is not recovered) since the cholesterol "salts" it out of solution. An additional explanation is that the cholesterol also stabilizes the provitamin D and the vitamin D in the organic solvents during the irradiation and subsequent manipulations incident to their separation.

The recovered crystal crops A and B were later augmented with fresh 7-dehydrocholesterol and a small amount of cholesterol (to make the same amount with the same proportions as aforesaid) and again dissolved in ether. The irradiation and subsequent fractionation were carried out as described above with equally good results. Such a procedure may be repeated time after time, and as mentioned previously the same cholesterol functions in the stabilization and recovery of successive amounts of provitamin with the loss of only very minor amounts.

It is to be understood that in the above application of this invention changes may be made without greatly affecting the results, particularly changes in the proportions of provitamin and inactivatable sterols. Thus lesser or greater amounts of cholesterol or other inactivatable sterol may be added. For example, as little as 10% of cholesterol in the mixture to be irradiated is helpful since, depending on the conditions of activation and therefore the amount of provitamin transformed, the recovered sterol mixtures contain cholesterol in amounts greater than 10%. Recovery of unchanged provitamin is obviously not so easily attained nor is the stabilization of the provitamin quite so efficient with very low amounts. Since cholesterol and other inactivatable sterols are cheap compared with the provitamin sterols there is no economy in using too little of the former.

Furthermore, it is to be understood that the provitamin D undergoing activation may have no stabilizing agent in admixture with it, or may have an insufficient amount of said agent in admixture with it to effect stabilization. In such a situation cholesterol or other inactivatable sterol is added to the resulting solution before the provitamin D is separated from the vitamin D. It should be added in sufficient quantities to facilitate the separation of provitamin D and vitamin D. As a general rule an amount of cholesterol or other inactivatable sterol corresponding to from one-fourth to seven-thirds the amount of provitamin D present in the solution is adequate for this purpose, although somewhat higher or lower amounts may be used with satisfactory results. For optimum results over a wide range of conditions it is preferable to add an amount of cholesterol or other inactivatable sterol to the activated solution which is approximately equal to its content of unchanged provitamin D.

This invention also has great utility when methods of activation other than that of ultraviolet light irradiation are used. It is well known that activation in the vapor phase by the so-called electrical discharge methods results in the destruction of a high proportion of the provitamin and that for this reason mainly some provitamins give a very low yield of vitamin D when activated in this manner. Here again 7-dehydrocholesterol is a particularly unstable provitamin. It has been found that this provitamin, as well as others, in admixture with inactivatable sterols such as cholesterol give improved yields when activated by high frequency electrical discharge methods.

*Example II*

Approximately 23 parts of a crystalline mixture of 7-dehydrocholesterol and cholesterol (51% 7-dehydrocholesterol by spectroscopic analysis) were introduced slowly by a special feeder into a highly evacuated and heated tube. As the crystals vaporized the vapors were passed through an activating zone where they were subjected to a high frequency electrical discharge and finally collected in a cooled receiver. At the end of the run 18 parts of the activated sterol solids in the receiver was secured for working up to separate activation products from unchanged provitamin and cholesterol. This was done by dissolving the sample in hot ethyl alcohol (S. D. 2B) and allowing the unchanged sterols to crystallize out in the refrigerator. By concentrating the mother liquors and proceeding as in Example I a total of two crops of recovered sterols were obtained and a corn oil solution of the vitamin D. A spectroscopic analysis of the recovered sterols, which were white and crystalline, showed a recovery of approximately 55% of the 7-dehydrocholesterol which had been put through the activation while biological assay of the vitamin D solution showed a much greater yield for the 7-dehydrocholesterol transformed than had previously been secured when 7-dehydrocholesterol alone was activated by this method. The recovered sterols were augmented with fresh 7-dehydrocholesterol and a small amount of cholesterol, as in Example I, and the activation process repeated with similarly satisfactory results.

Example III

Example I was repeated substituting for 7-dehydrocholesterol the provitamin D from mussels of the species *Modiolus demissus* (Dillwyn). Inactivatable sterols from the same species of mussels were substituted for the cholesterol in this example. The results were greatly superior to those obtained in the absence of the stabilizing agent.

Excellent results were also obtained when Example II was repeated using the provitamin D and stabilizing agent described in Example III.

It is to be understood that the foregoing examples are illustrative merely of the present invention and that they may be varied widely with respect to the individual components, the amounts thereof and the activating means, without departing herefrom.

In place of the provitamins D described in the examples, or in addition thereto, any one or more of the numerous other provitamins D may be employed. A representative few of these additional provitamins D are 7-dehydrostigmasterol, 7-dehydrositosterol, ergosterol, 22-dihydroergosterol, 7-dehydrocampesterol, epic-7-dehydrocholesterol, and other naturally occurring or synthetically produced provitamins D.

As previously mentioned, the preferred stabilizing agents are cholesterol and the inactivatable sterols naturally occurring in mussels. In place of or in addition to these stabilizing agents, however, any other inactivatable sterols or mixtures thereof may be employed with satisfactory results. A representative few of these stabilizing agents are sitosterol, stigmasterol, brassicasterol, ostreasterol, campesterol, fungisterol, zymosterol, clionasterol, fucosterol, dihydrocholesterol, coprosterol, sitostanol, and other sterols from plant and animal sources, as well as synthesized sterols.

The amount of provitamin D and stabilizing agent may vary within wide limits, depending upon the particular provitamin D and the particular stabilizing agent utilized as well as the manner in which the mixtures thereof are to be treated. For optimum results over a wide range of conditions, however, it has been found that the provitamin D should constitute at least 30% of the mixture and the stabilizing agent should constitute at least 20% thereof. Where 7-dehydrocholesterol or mussel provitamin D is the provitamin D and cholesterol or inactivatable sterols from mussels are the stabilizing agent, it is advisable for the best results to use amounts thereof which constitute about 50% of the mixture; in other words, a mixture containing about 50% 7-dehydrocholesterol and 50% cholesterol, or a mixture containing about 50% mussel provitamin D and about 50% of inactivatable sterols from mussels, or a mixture containing about 50% 7-dehydrocholesterol and about 50% of inactivatable sterols from mussels.

These mixtures may be intimately admixed and subjected to activation as such or they may be first crystallized in intimate admixture as described in the copending patent application referred to previously.

Any of the well-known antirachitic activation processes may be used, although it is preferred to activate these materials by means of ultraviolet light or the electrical discharge, either electrodal or electrodeless.

After the first activation step in the cyclic process the recovered provitamin D is ordinarily present in intimate crystalline admixture with the stabilizing agent. The amount of stabilizing agent at this stage is generally considerably above the optimum in these mixtures. In accordance with this invention this disadvantage is overcome by intimately admixing therewith additional quantities of a provitamin D of greater purity. This latter provitamin D may contain stabilizing agent or inert materials but preferably it is substantially pure. Likewise this latter provitamin may be identical with the provitamin which has been recovered from the activation step or it may be a different compound entirely. In the same manner, the stabilizing agent, which may or may not be added to the recovered mixture of provitamin D and stabilizing agent, may be the same as the initial stabilizing agent or may be chemically different therefrom.

A sufficient amount of a provitamin D which is either substantially pure or at least of appreciably greater purity than the recovered provitamin D should be added to the latter to bring the amount of the provitamin D within the ranges previously defined herein. When necessary, a sufficient amount of cholesterol or other stabilizing agent should also be added to bring the amount of stabilizing agent present in the resulting mixture within the ranges defined hereinabove. Since a very small amount of stabilizing agent is generally sufficient to accomplish this purpose it is to be understood that the addition of stabilizing agent to the recovered provitamin D in the stabilized mixture is frequently unnecessary and all that need be added thereto is additional provitamin D.

By means of the present invention the commercial process for producing vitamin D is rendered much more efficient than was heretofore possible. From the very beginning of this process until the very end, throughout each of the numerous activation steps, this invention permits optimum amounts of provitamin D and stabilizing agent to be maintained. Furthermore, it accomplishes this in a simple, economical and expeditious manner. Deterioration of provitamin D throughout the entire process is either eliminated entirely or rendered negligible. Likewise, the separation of provitamin D from vitamin D is accomplished much more readily than would otherwise have been possible. The vitamin D produced in accordance with this invention also appears to be more stable and in much greater yield and purity than would be possible in accordance with the prior art. Furthermore, this invention permits the speedy and practically complete separation of provitamin D from vitamin D.

As many apparently widely different embodiments of this invention may be made without departing from the spirit and scope thereof, it is to be understood that the invention is not limited to the specific embodiments thereof except as defined in the appended claims.

We claim:

1. In the process for producing vitamin D by antirachitically activating provitamin D, removing the so-produced vitamin D from unactivated provitamin D and subjecting the latter to antirachitic activation, the step which comprises conducting each of said antirachitic activation treatments on an activatable mixture approximately fifty per cent by weight of said mixture being 7-dehydrocholesterol and approximately fifty per cent by weight of said mixture being cholesterol.

2. In the process for producing vitamin D by antirachitically activating provitamin D, removing the so-produced vitamin D from unactivated provitamin D and subjecting the latter to antirachitic activation, the step which comprises conducting each of said antiratchitic activation treatments on an activatable mixture approximately fifty per cent by weight of said mixture being provitamin D from mussels and approximately fifty per cent by weight of said mixture being inactivatable sterols from mussels.

3. In a cyclic process for producing vitamin D by activating provitamin D stabilized with inactivatable sterols the step which comprises adding to the recovered, stabilized, provitamin D additional quantities of substantially pure provitamin D before subjecting said material to the succeeding activation treatment, so that at least thirty per cent by weight of the material subjected to activation is provitamin D and at least twenty per cent by weight of said material is an inactivatable sterol.

4. In the process for producing vitamin D by antirachitically activating a mixture of sterols, at least thirty per cent by weight of which is provitamin D and at least twenty per cent by weight of which is an inactivatable sterol, thereafter removing the so-produced vitamin D from the mixture and subjecting the so-treated mixture to further antirachitic activation, the step which comprises adding sufficient provitamin D to said treated mixture to bring it within the aforesaid range before subjecting it to further antirachitic activation.

5. In the process for producing vitamin D by antirachitically activating a mixture of sterols, at least thirty per cent by weight of which is provitamin D and at least twenty per cent by weight of which is an inactivatable sterol, thereafter removing the so-produced vitamin D from the mixture and subjecting the so-treated mixture to further antirachitic activation, the step which comprises adding sufficient 7-dehydrocholesterol to said treated mixture to bring it within the aforesaid range before subjecting it to further antirachitic activation.

6. In the process for producing vitamin D by antirachitically activating a mixture of sterols, at least thirty per cent by weight of which is provitamin D and at least twenty per cent by weight of which is an inactivatable sterol, thereafter removing the so-produced vitamin D from the mixture and subjecting the so-treated mixture to further antirachitic activation, the step which comprises adding sufficient provitamin D from mussels to said treated mixture to bring it within the aforesaid range before subjecting it to further antirachitic activation.

JAMES WADDELL.
WARREN W. WOESSNER.